United States Patent [19]

Hayashi et al.

[11] 4,431,098
[45] Feb. 14, 1984

[54] BIMETAL COIL MOUNTING ARRANGEMENT FOR VISCOUS FLUID COUPLING

[75] Inventors: Masaharu Hayashi; Kenji Hattori, both of Aichi, Japan

[73] Assignee: Aisin Seiki Kabushiki Kaisha, Kariya, Japan

[21] Appl. No.: 281,273

[22] Filed: Jul. 8, 1981

[30] Foreign Application Priority Data

Jul. 9, 1980 [JP] Japan .................................. 55-93626

[51] Int. Cl.³ ............................................ F16D 43/25
[52] U.S. Cl. .............................. 192/82 T; 192/58 B
[58] Field of Search .............. 192/82 T, 58 B; 73/236; 428/616

[56] References Cited

U.S. PATENT DOCUMENTS

| | | | |
|---|---|---|---|
| 4,103,765 | 8/1978 | Tinholt | 192/58 B |
| 4,185,726 | 1/1980 | Rohrer | 192/82 T X |
| 4,313,531 | 2/1982 | Hori et al. | 192/82 T X |

Primary Examiner—Cornelius J. Husar
Assistant Examiner—Joseph A. Fischetti
Attorney, Agent, or Firm—Sughrue, Mion, Zinn, Macpeak & Seas

[57] ABSTRACT

A temperature responsive viscous fluid coupling of the type having a bimetal coil secured at the outer end thereof to a cover member and at the inner end thereof to a rotatable shaft for controlling the fluid coupling is provided with at least one resilient member for engaging the radial outermost surface of the bimetal coil and an axially directed surface of the bimetal coil at a point circumferentially spaced from the outer end of the bimetal coil by approximately 150°.

2 Claims, 10 Drawing Figures

BIMETAL COIL MOUNTING ARRANGEMENT FOR VISCOUS FLUID COUPLING

BACKGROUND OF THE INVENTION

The present invention is directed to a bimetal coil mounting arrangement for a viscous fluid coupling and more specifically to resilient means for damping vibration transmitted to the bimetal coil from the engine to prevent excessive stress of the bimetal coil.

Viscous fluid coupling devices of the type to which the present invention relates are well known in the art and may be better understood by reference to U.S. Pat. Nos. 4,103,765 and 4,185,726.

A typical viscous fluid coupling device includes an output coupling member and a cover member cooperating to define a fluid chamber. The device includes a valve plate disposed to separate the fluid chamber into a reservoir and an operating chamber. An input coupling member is rotatably disposed within the operating chamber and the device includes valve means operable to control the flow of fluid between the reservoir and the operating chamber. The valve means includes a valve shaft extending outwardly through the cover means and being rotatable relative thereto. The rotational position of the valve shaft and the valve is controlled by a temperature responsive bimetal coil element having a first end portion connected to the valve shaft and a second end portion fixed relative to the cover means.

A problem which has arisen in connection with the use of viscous fluid couplings on internal combustion engines relates to the transmission of engine vibrations to the fluid coupling and the bimetal coil element. The excessive application of engine vibrations to the bimetal coil element substantially reduces the endurance of the bimetal coil element.

The viscous fluid coupling devices disclosed in U.S. Pat. Nos. 4,103,765 and 4,185,726 both disclose the use of resilient means for resiliently retaining the outer end of the bimetal coil. While the use of the resilient means reduces the transmission of vibrations from the engine to the bimetal coil to some degree, the primary purpose of the resilient means is to conformingly support the end of the coil to facilitate assembly and to prevent breakage of the coil at the point of securement due to vibration of the bimetal coil.

SUMMARY OF THE INVENTION

The present invention provides a new and improved bimetal coil mounting arrangement for use with a viscous fluid coupling device whereby the bimetal coil is substantially free of all vibrations.

The present invention provides a new and improved bimetal coil mounting arrangement for use with a viscous fluid coupling wherein resilient means are provided in engagement with the outermost surface of the coil at a point spaced from the outer end of the coil by approximately 150°. The resilient means effectively dampens all radial vibrations of the bimetal coil and is further provided with a radially inwardly extending portion for damping axial vibrations of the bimetal coil.

The foregoing and other objects, features and advantages of the invention will be apparent from the following more particular description of a preferred embodiment of the invention as illustrated in the accompanying drawings.

DETAILED DESCRIPTION OF THE INVENTION

Referring now to FIGS. 1-4, the temperature responsive viscous fluid coupling 10 includes a cover member 11 having a central cavity 11a. A valve operating shaft 12 is rotatably mounted through the center of the cover member 11 and projects into the cavity 11a. The details of the viscous fluid coupling and the valve for controlling the fluid have been omitted since they are not specifically related to the present invention.

Figure 1:
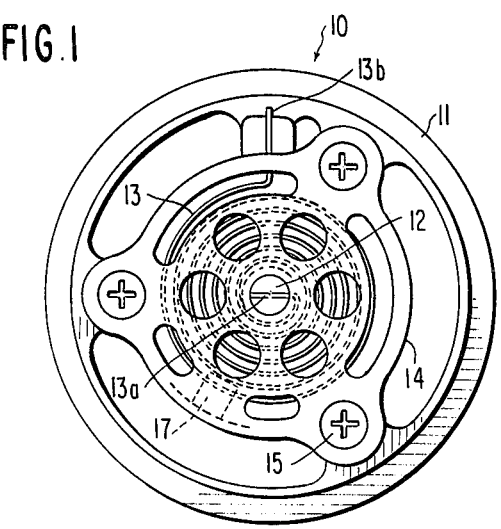
FIG. 1 is a front elevation view of the bimetal coil mounted on a viscous fluid coupling.
Figure 2:
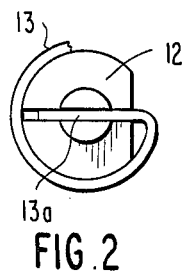
FIG. 2 is an enlarged detailed view, partly in section, showing the connection of the inner end of the bimetal coil to the rotatable valve operating shaft of the viscous fluid coupling.
Figures 3, 4:
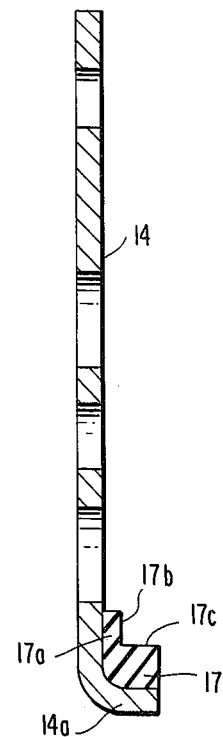
FIG. 3 is a partial transverse sectional view showing the relationship of the resilient means relative to the bimetal coil.
FIG. 4 is an enlarged sectional view of the cover plate and resilient means.

A temperature responsive bimetal coil 13 for detecting engine temperature is disposed within the cavity 11a. An inner end portion 13a of the bimetal coil 13 is fixed to the shaft 12 as best seen in FIG. 2 and the outer end portion 13b of the bimetal coil 13 is secured to the cover member 11 as best seen in FIG. 1. A plate 14 substantially overlies the bimetal coil 13 and is secured to the cover member 11 by means of screws 15. The plate 14 and the cover member 11 define a chamber 16 in which the bimetal coil 13 is located. The plate 14 is formed with a flange 14a which is bent at substantially right angles to the plane of the plate 14 and extends into the chamber 16 as best seen in FIG. 3. A resilient member 17 of rubber or any suitable synthetic material is secured to the surfaces of the plate 14 and the flange 14a as best seen in FIGS. 3 and 4 by any suitable means such as an adhesive. The resilient member 17 is provided with a flange 17a which extends radially inwardly toward the shaft 12. The flange 17a of the resilient member 17 is provided with a surface 17b adapted to engage the axially directed surface of the bimetal coil 13 as best seen in FIG. 3. The resilient member 17 is also provided with a surface 17c for engaging the radially outermost surface of the bimetal coil 13. It is desirable that the axially directed surface of the bimetal coil be slightly spaced from the surface 17b of the resilient member while the outer surface of the bimetal coil 13 be in contact with the surface 17c at ambient temperatures with the engine turned off. The initial pressure of the outermost surface of the bimetal coil 13 against the surface 17c of the resilient member 17 may also be varied to thereby vary the degree to which vibrations are damped.

Figure 6:
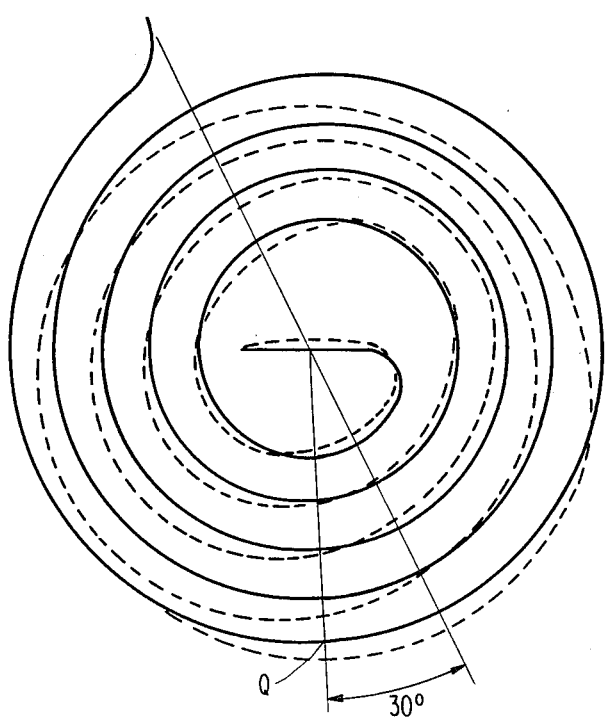
FIG. 6 is a schematic view of a bimetal coil showing the extent and location of radial vibration.

While a plurality of resilient members may be provided, the preferred location for a resilient member is best seen in FIG. 1 wherein the resilient member is circumferentially spaced from the end 13b of the bimetal coil by an angle of approximately 150°. This location is determined from the observed vibrations of a bimetal coil as shown schematically in FIG. 6. The vibrational movement of the bimetal coil is shown by the line of dashes and in order to effectively damp the vibrations, the resilient member would be located at a point approximately 30° from the diameter which is an extension of the radially extending outer end portion 13b of the bimetal coil 13.

Figure 5:
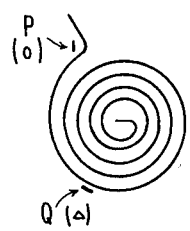
FIG. 5 is a schematic view of a bimetal coil showing the points for measuring the stress of the bimetal coil.
Figure 7A:
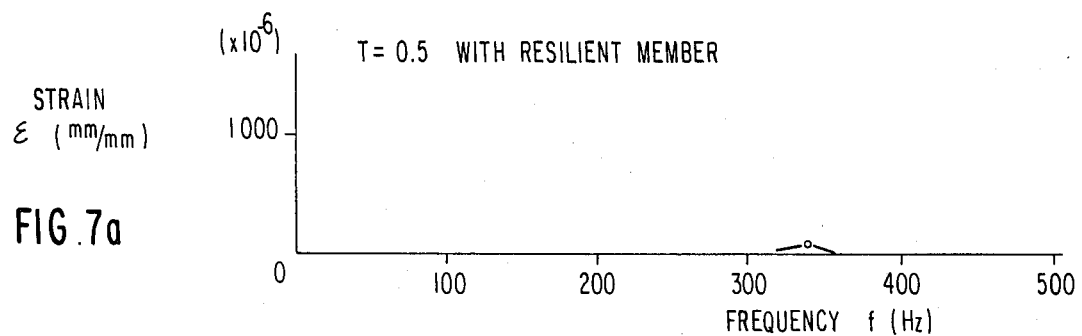
FIGS. 7a-d are graphs showing the strain at different locations on the bimetal coil relative to the applied vibrations with and without the resilient means according to the present invention.
Figure 7B:
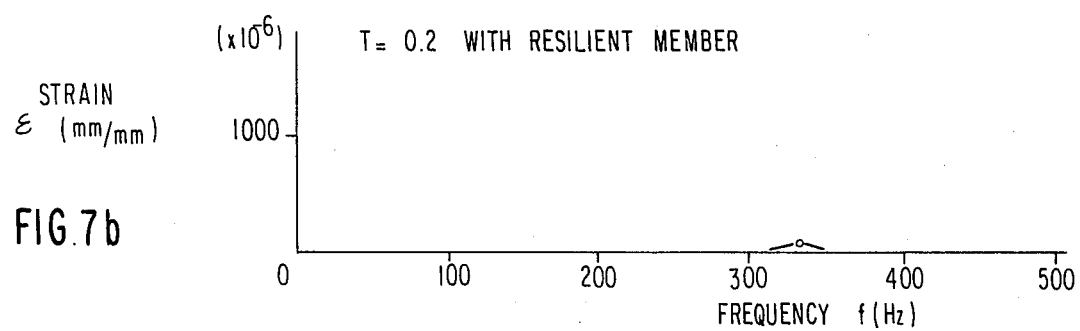
Figure 7C:
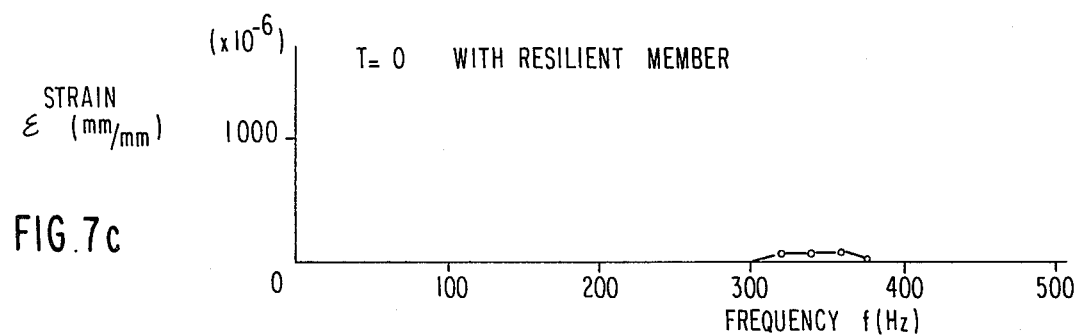
Figure 7D:
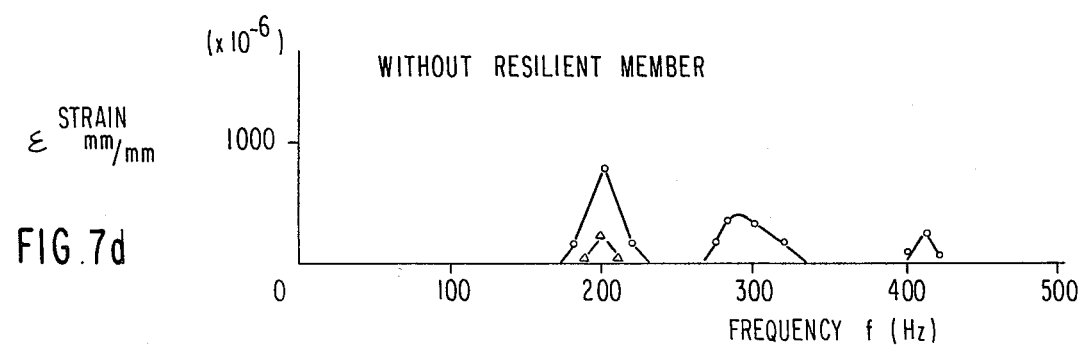

The two critical points for measuring strain caused by vibrations are shown at P and Q in FIG. 5. Without the use of the resilient member 17 according to the present invention, the strain at various vibration frequencies was measured at both points with the results shown graphically in FIG. 7d. The measurements of strain at point Q are shown by the small triangles on the graph and the strain measured at the point P is designated by the small circles on the graph. Thus, it is seen that the greatest strain occurs at points P and Q at a vibration frequency of approximately 200 Hz. By placing the resilient member 17 according to the present invention at the point Q, the strain is virtually eliminated at point Q and only minimal strain is noted at point P at frequencies between 300 and 400 Hz as seen by the graphs in FIGS. 7a-7c. The differences between the results shown in the graphs of FIGS. 7a-7c result from varying the degree to which the resilient member 17 is compressed from its non-assembled condition shown in FIG. 4 to its assembled condition shown in FIG. 3. This degree of compression is designated by T. As evidenced from the graphs, the strain at point P is reduced as the compression of the resilient member is increased.

While the invention has been particularly shown and described with reference to a preferred embodiment thereof, it will be understood by those in the art that various changes in form and detail may be made therein without departing from the spirit and scope of the invention.

What is claimed is:

1. A temperature responsive viscous fluid coupling comprising a cover member having a cavity, a shaft rotatably mounted in said cover member for controlling said coupling, plate means secured to said cover member over said cavity, a bimetal coil disposed in said cavity with the inner end thereof secured to said shaft and the outer end thereof secured to said cover member, flange means on said plate extending inwardly into said cavity adjacent the outer periphery of said coil and at least one resilient member circumferentially spaced from the outer end of said coil and secured to said flange means and said plate means adjacent said coil for damping vibrations transmitted to said bimetal coil, wherein said resilient member includes a first surface parallel to said plate means and a second surface parallel to said flange and perpendicular to said first surface with said first surface being spaced from an axially directed side surface of said bimetal coil by 0.2-0.5 mm and said second surface being disposed in abutment with the outer surface of said bimetal coil.

2. A temperature responsive viscous fluid coupling comprising a cover member having a cavity, a shaft rotatably mounted in said cover member for controlling said coupling, plate means secured to said cover member over said cavity, a bimetal coil disposed in said cavity with the inner end thereof secured to said shaft and the outer end thereof secured to said cover member, flange means on said plate extending inwardly into said cavity adjacent the outer periphery of said coil and at least one resilient member circumferentially spaced from the outer end of said coil and secured to said flange means and said plate means adjacent said coil for damping vibrations transmitted to said bimetal coil, wherein said resilient member includes a first surface parallel to said plate means and a second surface parallel to said flange and perpendicular to said first surface with said resilient member being circumferentially spaced from the outer end of said coil by approximately 150°.

* * * * *